United States Patent [19]

Griffith et al.

[11] Patent Number: 4,826,130

[45] Date of Patent: May 2, 1989

[54] HIGH-SPEED SOLENOID VALVE WITH POLYMER FILM LUBRICANT

[75] Inventors: Donald L. Griffith; Ali Acar, both of Los Angeles, Calif.

[73] Assignee: ITT Corporation, New York, N.Y.

[21] Appl. No.: 122,715

[22] Filed: Nov. 18, 1987

[51] Int. Cl.[4] .......... F16K 31/06

[52] U.S. Cl. .......... 251/129.15; 251/129.14; 251/368; 335/261; 335/279

[58] Field of Search .......... 251/129.15, 129.14, 251/368; 335/261, 279

[56] References Cited

U.S. PATENT DOCUMENTS

| | | | |
|---|---|---|---|
| 3,523,676 | 8/1970 | Barker | 251/129.14 X |
| 3,918,495 | 11/1975 | Abrahams | 251/368 X |
| 4,130,136 | 12/1978 | Garnier et al. | 251/368 X |
| 4,318,425 | 3/1982 | Marks | 251/368 X |
| 4,509,716 | 4/1985 | Barber et al. | 251/129.14 |
| 4,643,223 | 2/1987 | Abe et al. | 251/368 X |

OTHER PUBLICATIONS

Technical Information Bulletin H-1A (DuPont Kapton) 3 pages.

General Spec. Bulletin GS-82-2 (Kapton) 7 pages.

*Primary Examiner*—Arnold Rosenthal

*Attorney, Agent, or Firm*—Menotti J. Lombardi

[57] ABSTRACT

A high-speed solenoid valve is described having a polymer film lubricant located in the radial magnetic gap between the bore of the stator housing and the solenoid armature. The film forms a lubricating barrier during axial movement of the armature in the stator bore.

18 Claims, 1 Drawing Sheet

HIGH-SPEED SOLENOID VALVE WITH POLYMER FILM LUBRICANT

BACKGROUND OF THE INVENTION

This invention relates solenoid valves, and more particularly to fast response fluid flow control solenoid valves.

Previously, in order to position and control an actuating piston, it was necessary to control the flow into and out of the piston by an expensive electrohydraulic servo valve, and the pressure was increased in an analog manner. The new approach is to control pressure with inexpensive fast response on-off solenoid valves. These valves provide finite control as the solenoids are milliseconds fast. A small computer varies the amount of on-time and off-time so that the average fluid flow through the solenoid is smoothly variable.

In the design of such high-speed solenoid valves, it is essential that any lubricant employed in the magnetic radial gap have a boundary with minimum thickness and be uniform in thickness, since its presence defines a non-magnetic barrier. Non-uniformity causes differences in operating speeds, and hence fluctuations in the resulting flow (pressure) curves required. In essence the lubricant can contribute to the non-linearity of the valve because of different operating and release times.

It is also imperative that any products shed from the lubricant be non-contaminative, since orifices, seats, and controls of, for example, pneumatic missile systems are very tiny and sensitive to contamination. Attempts have been made with various materials to satisfy these requirements, including combinations of soft and hard platings, dry-film lubricants, such as teflon and molybdenum disulphide derivatives and mechanical hard surfacing techniques. The results were unsatisfactory, none meeting the required combination of consistency, noncontaminatory, and long life. For example, the thickness of the plating combinations were variable, and even though specified closely varied from lot to lot in all combinations. Further, the materials lasted for far too short a time, or resulted in unacceptable debris either from the plating or lubricant, or the base material became galled and fretted.

In order to overcome the foregoing problems and deficiencies of the prior art, an improved high-speed solenoid valve is hereinafter described.

BRIEF SUMMARY OF THE INVENTION

It is an object of the invention to provide a high-speed solenoid valve with a polymer film lubricant.

It is another object of the invention to provide a lubricant for a high-speed solenoid valve which has minimum friction, consistent tolerance, high cycle life, and is operable in temperatures of at least 500° F.

A further object of the invention is to provide a lubricant for a high-speed solenoid valve which exhibits the required lubricatory and bearing strength properties, and retains any debris accumulating in the magnetic radial gap of the valve.

According to the broader aspects of the apparatus of the invention, an armature is positioned to move within the bore of a stator housing, and a polymer film is placed in the radial magnetic gap to form a lubricating barrier between the stator housing bore and the armature during movement of the armature within the bore.

A feature of the invention resides in a high-speed solenoid valve comprising a stator housing having a coil and bore, an armature positioned within said bore for axial movement, a polymer film located within the radial magnetic gap to form a lubricating barrier between said bore and armature, and means responsive to the axial movement of said armature from a first unenergized coil condition to a second energized coil condition.

An advantage of using the polymer film in the radial magnetic gap for high-speed solenoids is that it provides the required lubricating and bearing strength for the armature, while retaining any debris accumulating in the gap, and thus resulting in long cycle life.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF PREFERRED EMBODIMENT

Figure 1:
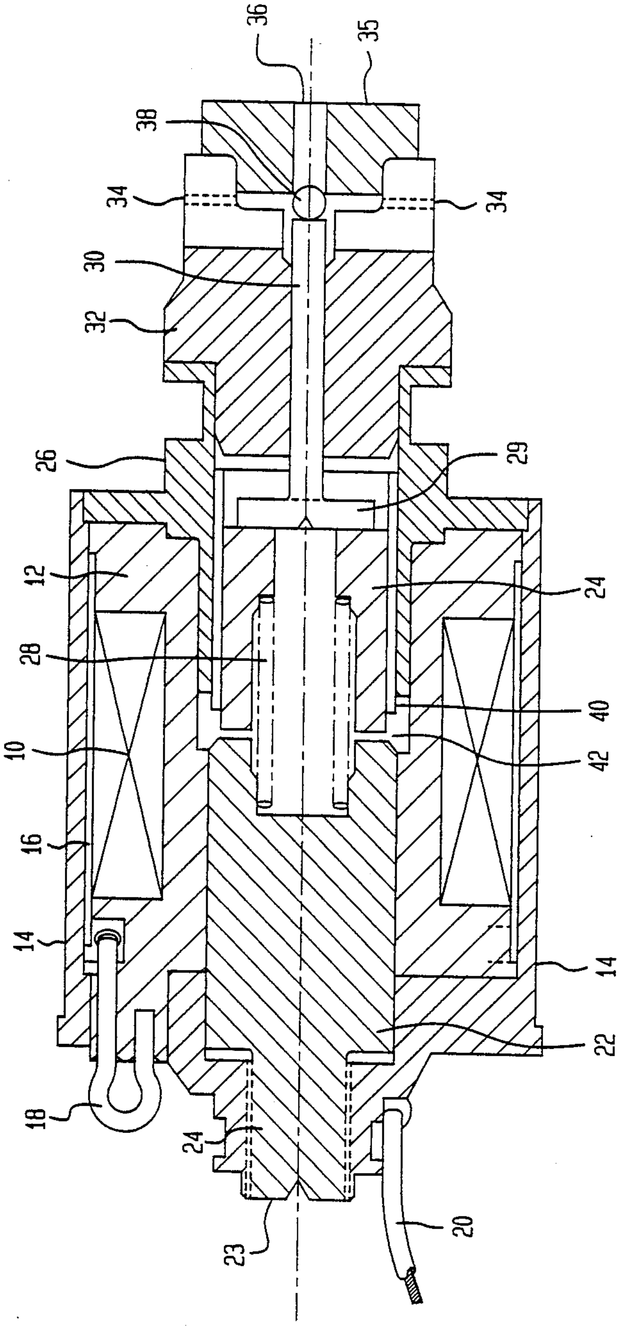
FIG. 1 is a plan view of a preferred embodiment of a high-speed solenoid valve with a polymer film lubricant in accordance with the invention.

Referring now to FIG. 1, the solenoid valve according to the invention is illustrated. A coil 10 is mounted on non-magnetically conductive body 12 and insulated from a magnetically conductive housing 14 by insulation means 16. The coil 10 is also connected in a known manner to lead members 18,20. A magnetically conductive plug member 22 is centrally positioned in housing 14 and axially adjustable by slot 23 in thread means 24. Magnetically conductive end housing member 26 has positioned therein magnetically conductive armature 24 which due to spring member 28 presses against a shaft hub 29 and away from plug member 22. Shaft extension 30 from hub 29 extends through and is slidably mounted in end cap 32 which includes an exhaust pressure ports 34 and an end plug 35 having an input pressure port 36. A valve ball 38 is forced against a ball seat on input pressure port 36 by the shaft extension 30.

A polymer film 40 is placed around armature 24 and within the gap formed by the inner bore of end housing member 26 and the outer diameter of armature 24. In the preferred embodiment, the gap is 0.001–0.002 inches and the polymer film is a 0.001 inch thick Kapton film (Kapton is a trademark of DuPont) and is obtainable with a thin coating of polytetrafluoroethylene, i.e. Teflon (Teflon is a trademark of DuPont). Kapton, which is a polyimide type plastic film, is available in exact thicknesses of 0.001 inches and up. Although Kapton is preferred, a 0.001 Mylar film (Mylar is a trademark of DuPont) which is a polyester type plastic film is also useable in the apparatus of the invention at less severe temperatures.

The polymer film serves as a lubricant and bearing for the rapid movement of the armature to open and close axial gap 42 between the end face of armature 24 and the end face of plug member 22. The film 40 contributes to the consistent operating movement of the armature resulting in exact operating times. The film has a relatively moderate coefficient of friction but is improved by the thin coating of Teflon. The film has an added advantage in that it is non-galling and it has the ability to absorb and immobilize any debris generated by the rapid movement of the armature in the bore. A thin coating of hard or soft material on the armature 24 or the bore of member 26 would not accomplish the same effect.

Figure 2:
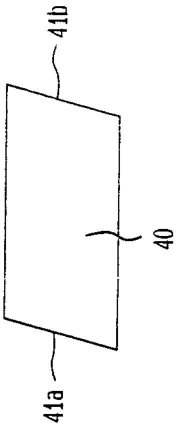
FIG. 2 is a detail of the polymer film lubricant used in the preferred embodiment of FIG. 1.

The film 40, as shown in FIG. 2, has its ends **41*a*, b cut on a bias to form a parallelogram. When the film 40 is then wrapped around armature 24, the slot created between edges of ends 41*a*, b does not occur in one place, but on a bias. This minimizes the effect on the magnetic gap formed between armature 24 and the bore of member 26. In practice, the edges of ends 41*a***, b may abut or be spaced from each other up to 0.1 inches.

In operation, the fast response solenoid valve shown in FIG. 1 has a pressurizing medium applied to port 34. Upon application of voltage to coil 10, a magnetic field is created in the path formed by housing 14, member 26, armature 24, and plug 22. The magnetic field imposes a force on armature 24 overcoming the force of spring 28 and urges armature 24 toward plug 22, reducing axial gap 42 to zero. When armature 24 moves, valve ball 38 is moved off its seat on end plug 35 by the pressuring medium allowing the pressuring medium to discharge thru the exhaust port 34. Axial gap 42 can be adjusted to the desired width by turning slot 23 in plug 22 in or out of housing 14. Film 40 inserted in the radial gap between the armature 24 and the bore of member 26 provides the lubricant, bearing strength, and retains any debris accumulating in the radial gap.

A fast response solenoid valve of the invention would typically have an operating voltage of 28 VDC pulse with modulated at the rate of 250 Hz. A helium pressure medium would be applied to the inlet port at 1100 psi and the exhaust port would be at 550 psi. This type valve provides finite control as the solenoids are milliseconds fast and are opened and closed continuously, hundreds of times per second, or every ten milliseconds. These valves lend themselves to a multitude of missile and non-missile applications. It is therefore imperative that such a solenoid valve have a high cycle life. Prior to the addition of the polymer film in the radial gap, these solenoid valves failed at much less than 2-million cycles on average. Now, due to the discovery of the use of a polymer film in the radial gap of the solenoid valve, operating life cycles greater than 8-million cycles have been achieved. This significant life cycle improvement has heretofore been unknown in the art.

It should also be evident to those skilled in the art, that a rotary valve with an appropriately configured stator and armature may utilize the polymer film lubricant in the radial magnetic gap in accordance with the foregoing disclosure.

While the present invention has been disclosed in connection with the preferred embodiment thereof, it should be understood that there may be other embodiments which fall within the spirit and scope of the invention as defined by the following claims.

What is claimed is:

1. Apparatus comprising:

a stator housing having a bore;

an armature located within said bore and dimensioned to provide a radial magnetic gap between said bore and armature; and a polymer film located within said gap to form a lubricating barrier between said bore and armature during movement of said armature within said bore, said polymer film is in the form of a parallelogram and 0.001 to 0.002 inches thick.

2. The apparatus of claim 1 including a plug member being located within said bore in axial alignment with said armature and forming with said armature an axial magnetic gap.

3. The apparatus of claim 2 including means slidably mounted and responsive to said armature movement between first and second axial positions.

4. The apparatus of claim 1 wherein said polymer film is wrapped around said armature and the edges of said wrapped parallelogram abut or are spaced from each other by up to 0.1 inches.

5. Solenoid apparatus comprising:

a solenoid housing having a bore;

a solenoid armature slidably positioned and radially spaced from said bore to provide a radial magnetic gap; and a polymer film positioned within said gap to form a lubricating barrier between said bore, and armature, and a bearing surface for said armature during axial movement of said armature within said bore, said film being in the form of parallelogram to minimize the effect on said gap.

6. The apparatus of claim 5 including a plug member located and fixed within said bore in axial alignment with and spaced from said armature, and said member forming with said armature an axial magnetic gap.

7. The apparatus of claim 6 including means axially movably with said armature between first and second axial positions.

8. The apparatus of claim 7 wherein said polymer film is 0.001 to 0.002 inch thick, and said film wrapped around said armature such that the edges of said wrapped parallelogram abut or are spaced from each other by up to 0.1 inches.

9. A high-speed solenoid valve comprising:

a stator housing having a stator coil and a bore;

an armature being positioned within said bore and defining a radial magnetic gap; and a polymer film being positioned within said gap and forming a lubricating barrier between said stator housing bore and said armature, said film is a polyimide type plastic film having a thickness of 0.001 to 0.002 inches with a thin coating of polytetrafluroethylene, and said film has a parallelogram shape and is wrapped around said armature to form the lubricating barrier between said solenoid housing bore and said armature.

10. The valve of claim 9 including a magnetic plug member being fixed within said bore in axial alignment with said armature, one face of said member defining with one face of said armature an axial magnetic gap.

11. The valve of claim 10 including spring means mounted between said member and said armature to maintain said axial magnetic gap when said stator coil is in an unenergized condition.

12. The valve according to claim 11 wherein said axial gap is reduced to zero when said stator coil is in an energized condition.

13. The valve according to claim 12 including end housing means mounted on one end of said stator housing adjacent said armature, said end housing means having a housing bore in axial alignment with said armature, a pressure medium port having a ball valve seat, and an exhaust port; and a valve ball being retained in said seat in said unenergized condition.

14. The valve according to claim 13 including a shaft slidably mounted in said housing bore and engaging said armature and said ball to retain said ball in said seat in said unenergized condition.

15. The valve of claim 9 wherein the edges of said wrapped parallelogram abut or are spaced from each other by up to 0.1 inches.

16. A high-speed solenoid valve comprising in combination:

a solenoid housing having a stator coil and a bore;

a solenoid armature slidably mounted in and radially spaced from said bore to provide a radial magnetic gap; and a polymer film in said radial magnetic gap in the form of a parallelogram providing a lubricating barrier and bearing surface for the armature, whereby any debris accumulated in said gap is retained by said film.

17. The combination of claim 16, wherein said film is a polyimide type plastic film with a thin coating of polytetrafluoroethylene.

18. The combination of claim 16, wherein said film is a polyester type plastic film.

* * * * *